United States Patent [19]

Owings

[11] 3,936,070
[45] Feb. 3, 1976

[54] CARTS

[76] Inventor: Kenneth B. Owings, 620 Pugh Road, Strafford, Pa. 19087

[22] Filed: Feb. 1, 1974

[21] Appl. No.: 438,907

Related U.S. Application Data

[63] Continuation of Ser. No. 154,504, June 18, 1971, abandoned.

[52] U.S. Cl. .......... 280/47.18; 280/47.25; 297/129; 298/5
[51] Int. Cl.² .......................................... B62B 1/12
[58] Field of Search .... 280/30, 47.18, 47.13, 47.24, 280/47.25, 47.26; 298/2, 5, 17 B; 248/137, 140; 297/118, 93, 129; 220/9 R

[56] References Cited
UNITED STATES PATENTS

| | | | |
|---|---|---|---|
| 1,050,669 | 1/1913 | Lee | 239/172 X |
| 2,121,224 | 6/1938 | Garlinghouse | 280/47.26 X |
| 2,461,353 | 2/1949 | Stelzer et al. | 280/30 |
| 2,587,881 | 3/1952 | Oakes | 297/327 |
| 2,725,242 | 11/1955 | Peplin | 280/47.18 X |
| 2,889,152 | 6/1959 | Hurst et al. | 280/47.26 |
| 3,141,681 | 7/1964 | Cedarstrand | 280/47.25 |
| 3,250,660 | 5/1966 | Greig et al. | 425/109 X |
| 3,351,265 | 11/1967 | Miller | 229/43 |

FOREIGN PATENTS OR APPLICATIONS

| | | | |
|---|---|---|---|
| 617,051 | 1/1949 | United Kingdom | 280/47.24 |
| 538,165 | 7/1941 | United Kingdom | 280/47.24 |

Primary Examiner—Robert J. Spar
Assistant Examiner—Leslie J. Paperner
Attorney, Agent, or Firm—Synnestvedt & Lechner

[57] ABSTRACT

A cart-like vehicle has a symmetric concave body portion which is pivoted on a frame on a tilt axis above the axis of the wheels so that the cart may be tilted in one longitudinal direction to serve as a personnel conveyance, or may be loaded with its carrying compartment upright and unloaded by merely tilting the body in a second longitudinal direction to a dumping position. The body portion is substantially wedge-shaped, with its tilt axis closer to the top than to the bottom, so the body may be readily pivoted in either longitudinal direction. Both of said axes lie substantially in the transverse, vertical mid-plane of the body when said body is upright. Means are provided to support a seat for using the cart as a passenger vehicle when tilted in one direction, and the cart also includes means for supporting a cover or shelves when the cart is used to convey liquids or as a free-standing serving cart. Adjustable stabilizing means are provided to stabilize the body in its various pivoted positions relative to the frame. When tilted longitudinally to a dumping position, the upper edge of one of the two converging, fore-and-aft, walls can be swung down to be adjacent to the vehicle-supporting surface. A canopy is mountable over the carrying compartment, when desired, and the cart's frame is adapted for moving the vehicle and may also be used to mount various accessories such as spraying equipment, lawn rollers and the like to further diversify the purposes for which the cart may be used.

12 Claims, 9 Drawing Figures

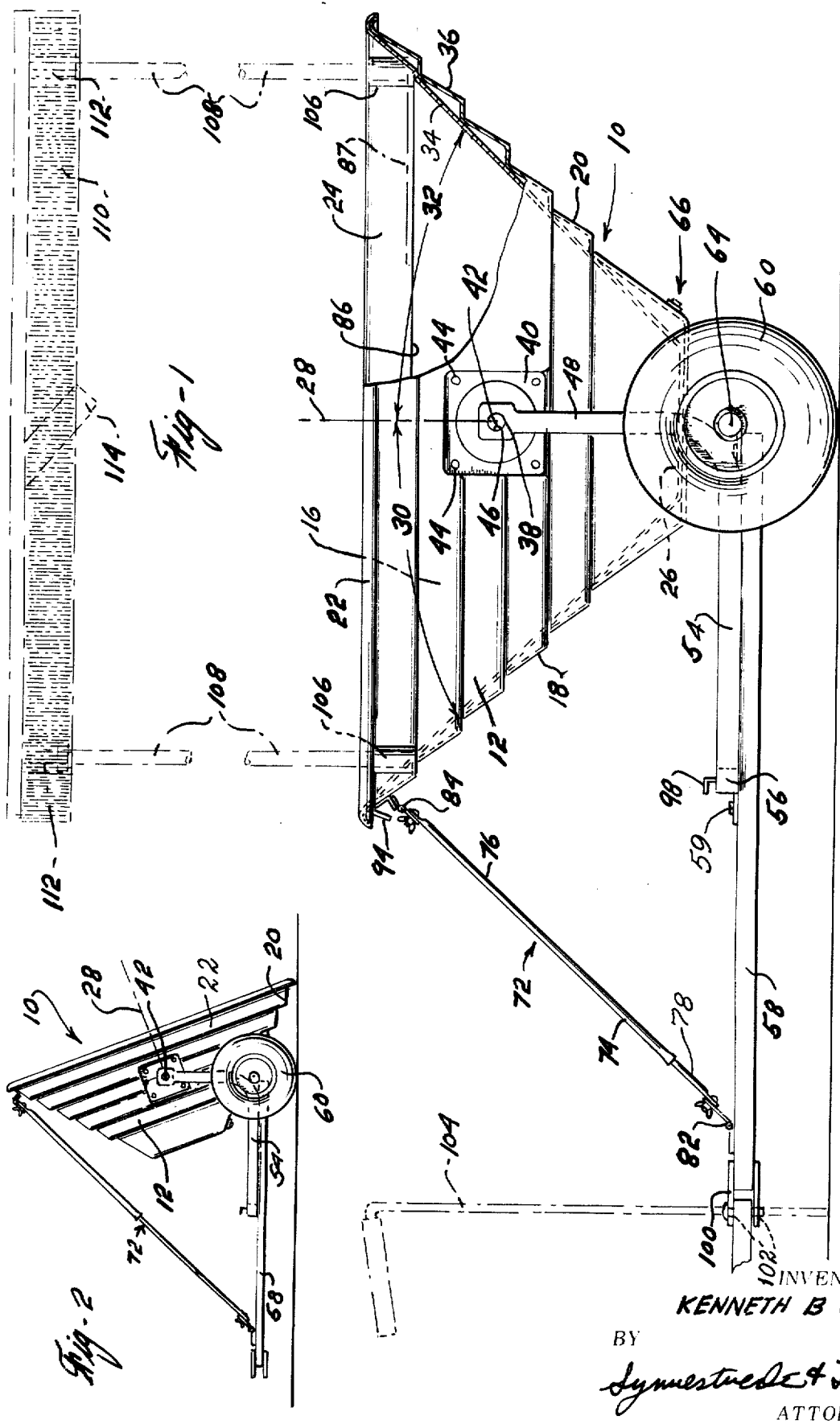

INVENTOR.
KENNETH B OWINGS
BY
ATTORNEYS

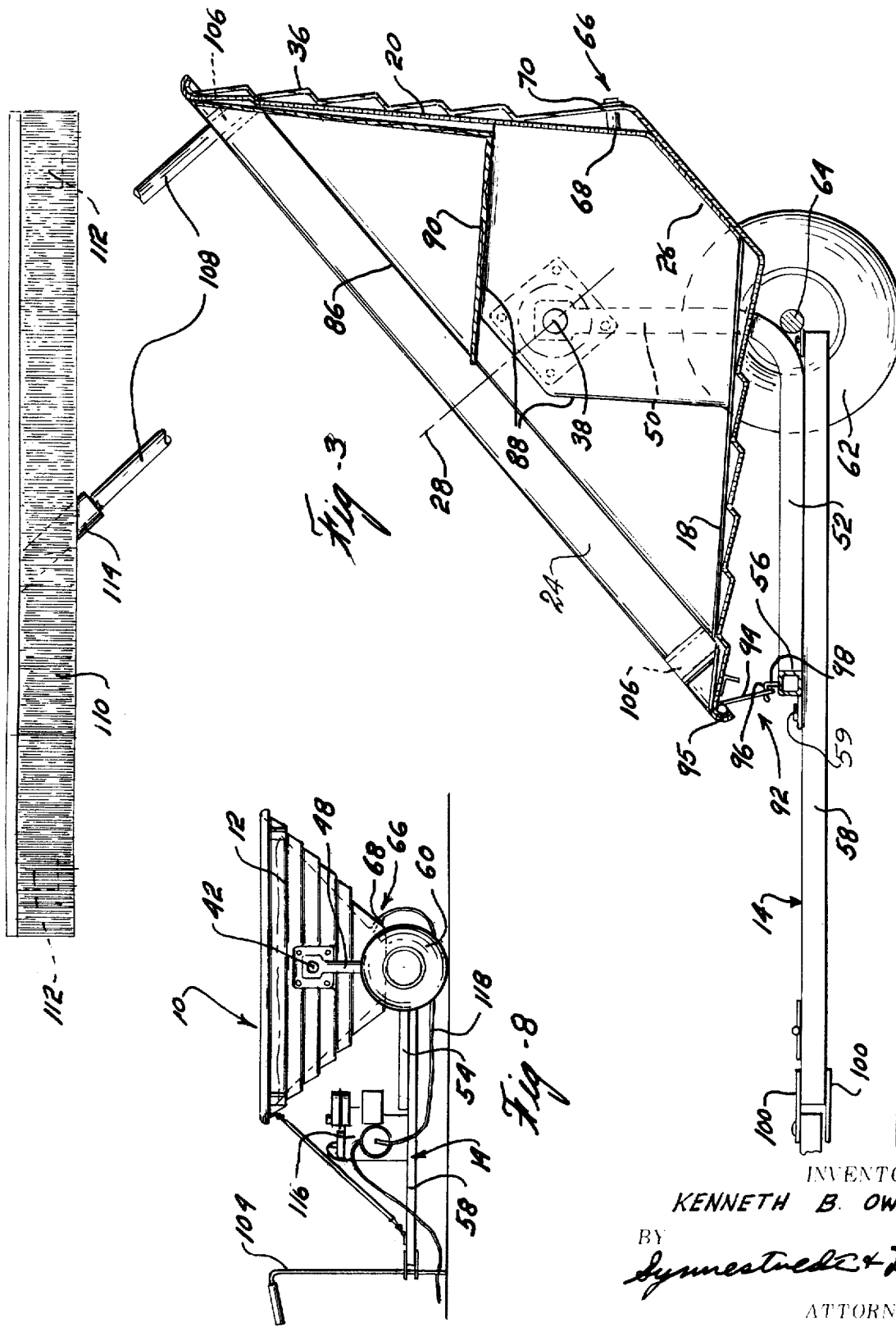

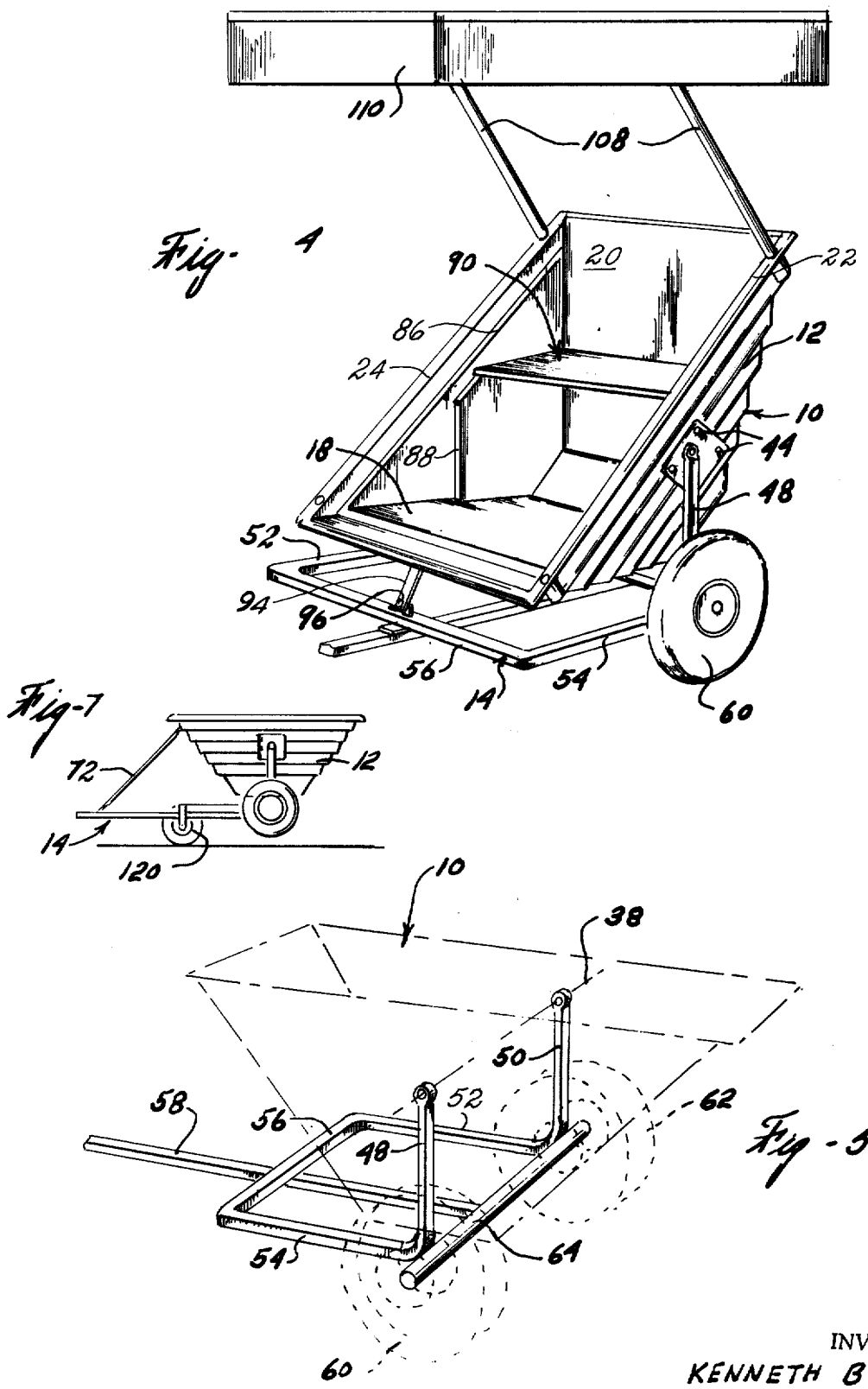

CARTS

This is a continuation of Ser. No. 154,504, filed June 18, 1971, and now abandoned.

BACKGROUND

This invention relates generally to vehicles and is more particularly directed to the type of vehicle normally used to contain and/or transport loads, commonly referred to as carts.

Garden-type carts or pieces of lawn furniture in some respects similar to the instant invention are known. In general, the heretofore known devices of this type include a receptacle body part that is fixedly secured to its frame so that, in order to unload the device, the entire device must be tilted, or a tail-gate or similar unloading means provided, whereby the loading and unloading cycles of these devices are time consuming and sometimes physically difficult tasks. Prior devices having tailgates and the like cannot be used to transport liquids because such devices tend to leak. Moreover, the versatility of such devices is limited to a great extent by the inability of the body portion to assume more than one operative position relative to its supporting frame.

Some heretofore known devices of the general type contemplated by the present invention have a body portion pivotally mounted to a frame. However, the body portions of these devices have generally been asymmetric and the pivoting axis disposed so that the body portion can pivot to only a limited extent relative to the supporting frame. Asymmetric body portions undesirably prevent such carts from having a balanced loading characteristic, and the limited number of operative positions that the body portions of such carts may assume relative to their frames inherently limits the number of purposes and functions which such carts may perform.

Summary of the Invention

In accordance with the present invention, a cart is provided with a symmetric body portion that is pivotally mounted to a wheeled supporting frame about a pivoting axis above that of the frame wheels. To provide the cart with a balanced loading characteristic, the body portion pivoting axis perferably is located substantially in a mid-plane about which the body portion is symmetric. To further enhance its balanced characteristic, the axis of the frame wheels preferably also falls substantially with the body portion mid-plane when the mid-plane is vertically disposed These various features combine to balance the cart when loaded so that a minimum of stabilizing structure need be provided to prevent undesired movement of the body relative to the frame.

The body portion preferably includes two walls symmetrically disposed on opposite sides of the mid-plane which slope upwardly and outwardly from the bottom of the cart's carrying compartment bottom to provide a wedge-shaped configuration to the body. The optimum angular relationship between these walls and the mid-plane is about 45°, so that these walls form about a 90° angle with respect to each other. These features enable the body portion to be pivoted in either direction to form a flat-bed conveyance, and means are preferably provided to support a seating member so that the cart may also be used as a passenger vehicle when the body portion is so disposed. The invention preferably includes means for locking or stabilizing the body portion to the frame in its various pivoted positions.

The preferred frame of the invention includes parallel frame legs having at one end thereof upwardly extending body support struts and being closed at the other end by a closing member. A multitude of auxiliary equipment may be mounted to the frame to easily adapt the cart for use as a sprayer, a lawn roller and other purposes.

In its preferred form, the body portion is integrally formed of a two ply plastic construction and most of the frame members are formed from a single piece of framing material. These features provide the cart with a lightweight yet strong and durable construction.

It is, therefore, an object of the invention to provide a cart with a symmetric body portion pivotally mounted to a frame so that the body may be pivoted to assume a number of operative positions relative to its frame.

Another object of the invention is to provide a cart with a pivoted, symmetric body portion that has a balanced loading characteristic.

A further object of the invention is to provide a cart which may be used as a receptacle load carrier, a flat-bed carrier, and a passenger vehicle.

It is a still further object of the invention to provide a cart that is readily adaptable for use with auxiliary appliances such as spraying equipment and lawn rollers.

These and further objects, features and advantages of the invention will become more apparent as the following detailed description of the preferred embodiment thereof proceeds with continued reference to the accompanying drawings.

DESCRIPTION OF THE DRAWINGS

FIG. 1 is a view in side elevation, partially broken away, of a cart in accordance with the preferred embodiment of the invention with the body portion disposed in its normal load-carrying position.

FIG. 2 is a diagrammatic view in side elevation of the cart depicted in FIG. 1 with the body portion pivoted to its rear dumping or loading position.

FIG. 3 is a side elevational view in section of the preferred embodiment with the body portion in its front or surrey position.

FIG. 4 is a perspective view of the cart depicted in FIG. 1 with the body portion pivoted to its front or surrey position.

FIG. 5 is a perspective view of the frame of the cart shown in FIG. 1.

FIG. 7 is a diagrammatic view in side elevation of the cart depicted in FIG. 1 showing a roller attached to its frame.

FIG. 8 is a diagrammatic side elevational view showing spraying equipment installed on the cart.

DETAILED DESCRIPTION OF PREFERRED EMBODIMENT

As used in the following description and in the claims appended hereto, the term "longitudinal" designates a direction which is substantially parallel to the direction of normal movement of the cart, and the term "transverse" is used to designate directions which are substantially perpendicular to the direction of movement of the cart.

Figure 6:
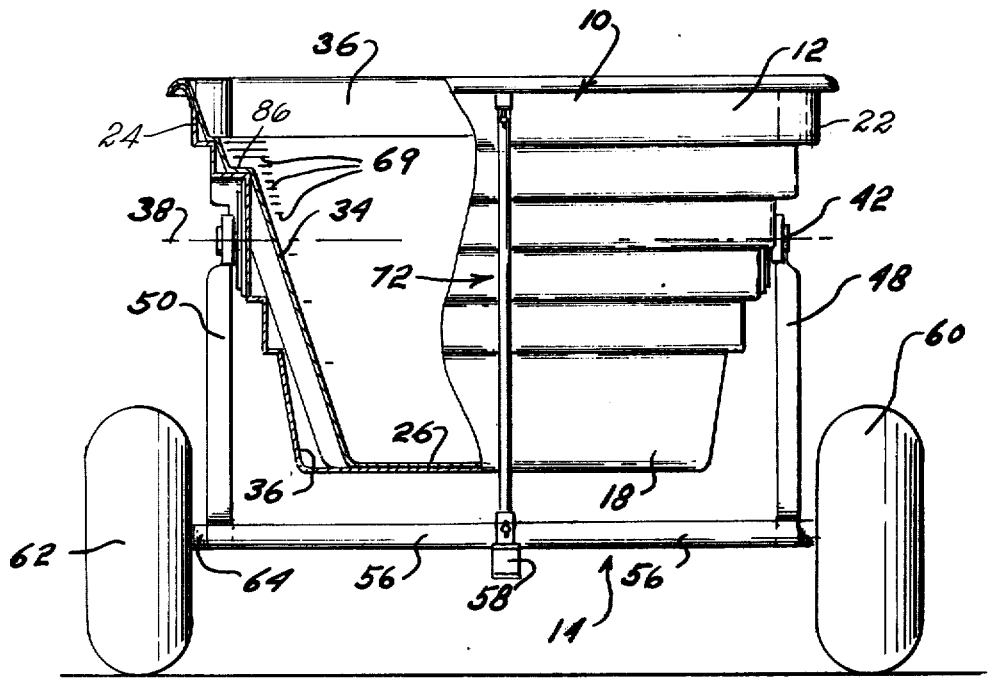
FIG. 6 is a front elevational view, partially broken away, of the cart shown in FIG. 1.

With reference now to the drawings, the detailed construction of a cart generally designated by the reference numeral 10 is best seen in FIGS. 1, 3 and 6 as consisting generally of a body portion 12 and a frame 14. The body portion 12 includes walls which define a carrying compartment 16. In the preferred embodiment shown, the wall means are first and second transverse side walls 18 and 20, respectively, and first and second longitudinal side walls 22 and 24, respectively. The side walls 18, 20, 22 and 24, together with a bottom wall 26, combine to define the carrying compartment 16.

The carrying compartment 16 is substantially symmetric about a transverse mid-plane indicated at 28 which bisects the carrying compartment 16 into two symmetrical portions. The transverse walls 18 and 20 comprise a pair of walls symmetrically disposed on opposite sides of the mid-plane 28, which are formed to slope generally upwardly from the bottom 26 on both sides of the transverse mid-plane 28 and form substantially equal acute angles 30 and 32 with the mid-plane 28. Preferably the angles 30° and 32° are about 45°, so that the walls 18 and 20 form about a 90° angle with each other. This configuration results in a generally wedge-shaped carrying compartment 16 wherein the bottom area 26 of the compartment is less than the opening area defined by the upper lip of the walls 18, 20, 22 and 24.

The walls 18, 20, 22, 24 and 26 are preferably fabricated from strong, liquid impermeable material. To that end, these walls are preferably formed from more than one ply of plastic material sealed together at predetermined points of contact to form a lightweight yet strong structure. As illustrated in FIG. 1, the wall 20 comprises an inner ply 34 and an outer ply 36. The outer ply 36 is formed with a plurality of triangular shaped steps, while the inner ply 34 is for the most part flat so that the two plys are sealed together only at predetermined lines of contact. This wall construction, which applies as well to walls 18, 22 and 24, as shown in FIGS. 3 and 6, provides a lightweight, strong, and watertight structure. This manner of fabricating structures of this type is generally disclosed in U.S. Pat. No. 3,250,660, 3,242,245 and 3,383,720.

In order to pivotally mount the body portion 12 about a transverse horizontal pivoting axis 38, pivot plates 40, including integral outwardly extending pivot pins 42, are symmetrically attached to the longitudinal walls 22 and 24 by conventional fastening means, such as, for example, bolts 44, so that the pivoting axis 38 defined by pivot pins 42 is located substantially within the body portion transverse mid-plane 28. The pivot pins 42 cooperate with corresponding apertures 46 formed in the upper portion of body portion support struts 48 and 50, which struts form part of frame 14.

The remainder of frame 14 (as best seen in FIG. 5) comprises two generally longitudinally extending, substantially parallel frame legs 52 and 54 to one end of which the lower ends of body portion support struts 48 and 50 are fixedly secured. The other ends of legs 52 and 54 are interconnected by a transverse frame closing member 56. This arrangement of legs 52 and 54 and frame closing member 56 produces a generally U-shaped configuration for the frame 14. In its preferred form, frame legs 52 and 54, closing member 56, and support struts 48 and 50 are a single elongated piece of material bent into the appropriate configuration to provide the frame 14 with optimum strength and to minimize manufacturing expense. A longitudinally disposed member 58 is connected by conventional means such as, for example, boolts 59 to the frame closing member 56 and axle 64 (described below) intermediate the legs 52 and 54 so as to extend longitudinally away from the body portion 12 for connection with any desired type of towing means.

In order to provide the cart 10 with mobility, wheel means such as the wheels 60 and 62 are rotatably mounted by conventional means on a transversely extending axle 64 which is affixed to the frame 14 by conventional means, such as, for example, by welding, near the junction between body portion support struts 48 and 50 and frame legs 54 and 52 so that axle 64 is approximately vertically below the pivoting axis 38. The bottom of bottom wall 26 is positioned sufficiently above the axle 64 so that the body portion 12 may pivot freely about its axis 38 without interference between the body portion and any part of the frame 14.

In view of the foregoing, it should be apparent that in accordance with the preferred embodiment of the invention, the body portion pivoting axis 38 is disposed above and parallel to the wheel means axis defined by axle 64. Moreover, in accordance with the preferred embodiment, both of these axes 38 and 64 fall substantially within the body transverse mid-plane 28 when the body portion 12 is positioned (as shown in FIG. 1) in what may be termed its normal carrying position, i.e., when the carrying compartment 16 forms a receptacle and the transverse mid-plane 28 is substantially vertically disposed so that the maximum carrying surfaces of the walls 18, 20, 22, 24 and 26 are presented for supporting the desired load. These features contribute significantly to balancing properties of the cart 10, whereby the loads in the carrying compartment 16 will be substantially equally distributed on both sides of the mid-plane 28, the pivoting axis 38, and the wheel axis 64 when the cart 10 is towed horizontally. Thus the cart 10 is essentially self-balancing and a minimum of restraint need be used to prevent undesired movement of the body portion. This balancing characteristic is enhanced as the vertical distance between the pivoting axis 38 and the bottom 26 of the body portion 12 increases consistent with ease of dumping, and it is preferred that this distance be at least equal to and preferably (as shown) greater than the vertical distance from the top of the body portion 12 to the pivoting axis 38 to optimize the balancing characteristic of the cart 10.

The walls 18, 20, 22, 24 and 26 are preferably fabricated of liquid impermeable material such as, for example, polyethilene, so that the cart 10 is capable of holding and transporting liquid and powdered materials as well as solid materials. To facilitate use of the cart 10 with liquids, the cart 10 has liquid discharging means generally indicated at 66 comprising a liquid discharge aperture 68 formed in the carrying compartment defining wall 20 near the bottom of the compartment and a removable discharge aperture covering member 70, so that the aperture 68 may be covered to prevent liquid discharge when desired, and may be uncovered to discharge liquid when desired. As shown, the discharge aperture 68 has an externally threaded portion which corresponds to internal threads provided on the aperture cover 70 to allow for removal of the cover 70 as desired. Liquid level marks 69 (see FIG. 6) on wall 18 facilitate use of the cart 10 with liquids and the like.

Figure 1A:
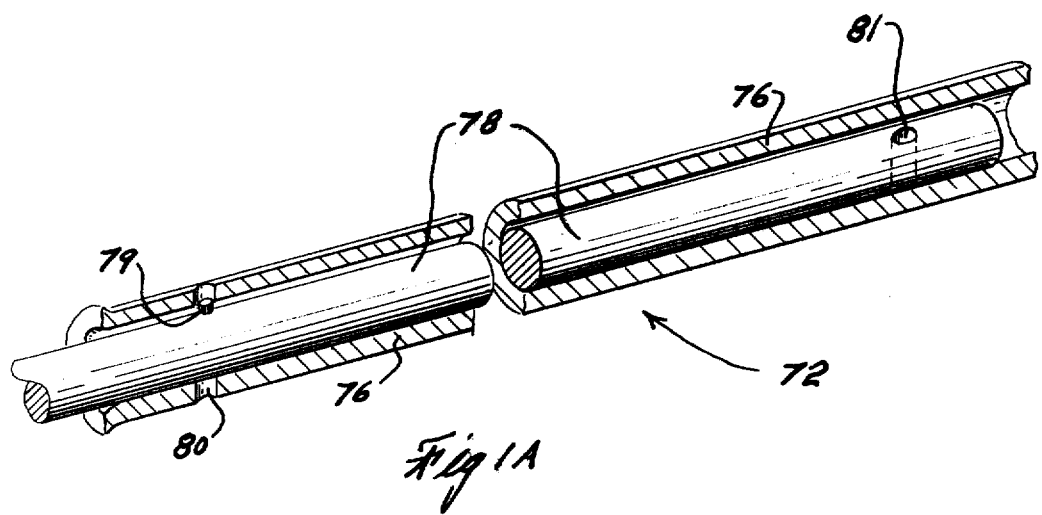
FIG. 1A is a fragmentary sectional view of the preferred stabilizing means according to the invention.

In order to stabilize the body portion 12 in the many positions it may assume with respect to the frame 14 as the body portion is pivoted about the pivoting axis 38, the cart 10 preferably includes adjustable stabilizing means 72 which interconnects the body portion 12 and the frame 14. In the preferred embodiment 10, the stabilizing means 72 (FIGS. 1 and 1A) comprises an elongated, telescopically adjustable rigid member or bar 74 consisting of at least two telescopically engaged members 76 and 78. Telescoping member 76 is a hollow tube having a bore slightly larger than the outer diameter of the rod-like telescoping member 78. One end of the telescoping bar 74 is pivotally connected to the towing member 58 of frame 14 by a conventional pivotal connection designated at 82. The other end of the telescoping bar 74 is pivotally connected to the body portion 12 by a similar conventional pivotal connection designated 84 located at the transverse center of the upper lip of transverse wall 18. A radially extending pin 79 is affixed to the lower end of the rod-like inner telescoping member 78, and the inner diameter of the tube 76 is large enough to allow the tube 76 to pass over the pin 79. The open end of tube 76 is flared outwardly so that the tube 76 passes over the pin 79 as the members 76, 78 are telescopically engaged. A pin receiving aperture 80 is formed in tube 76 to receive the pin 79 and the rod 78 is bent slightly to force the pin 79 into aperture 80 when these two elements are registered to prevent longitudinal movement between members 76 and 78. The pin 79 and aperture 80 are positioned to stabilize or lock the body portion 12 in its normal load carrying position relative to the frame 14 as shown in FIG. 1. A pin receiving aperture 81 is formed near the other end of the rod-like member 78 to register with tube aperture 80 to receive a pin or the like to increase the length of the telescoping member 74 to stabilize the body portion 12 in its rear loading position where rear wall 20 is approximately horizontal and preferably forms about a positive 10° angle with the horizontal as described below wth reference to FIG. 3, so that the cart 10 may be used as a passenger vehicle or flat-bed conveyance in its rear position.

Obviously further pairs of registering apertures similar to apertures 80 and 81 could be provided to adjustably stabilize the body portion 12 relative to the frame 14 at any other desired position.

The cart 10 preferably includes means for positioning a flat member within the carrying compartment 16 when the body portion 12 is disposed as shown in FIG. 1. Thus, the preferred embodiment 10 includes inwardly extending shoulders 86 formed in the walls 18, 20, 22 and 24, which shoulders are disposed to define a support surface substantially perpendicular to the body portion transverse mid-plane 28 to provide a supporting surface for flat members such as a cover to prevent splashing of liquids in the carrying compartment 16 during transportation, or to support shelves, such as shelf 87, upon which to place desired objects. Although only one level of shoulders 86 is shown, it should be readily apparent that a plurality of such shoulders could be provided at various levels within the compartment 16 to afford the cart greater versatility without departing from the invention.

The foregoing description has focused primarily upon the functioning of the cart 10 when the body portion 12 assumes the normal cart loading position wherein the transverse mid-plane 28 is substantially vertical. The description will now proceed to the instances wherein the body portion 12 is pivoted about its axis 38 to assume alternate positions which afford much of the versatility of the invention. For example, the body portion 12 may be pivoted approximately 45° in a counterclockwise direction toward the frame 14 from its FIG. 1 position to assume the position shown in FIGS. 3 and 4. In the latter position, the flat inner surface of the first transverse wall 18 is approximately horizontal so that the cart 10 may be used as a flat bed conveyance. In order to prevent articles carried on the flat inner surface of the wall 18 from bouncing out of the carrying compartment 16 when the cart is being towed over rough terrain, it is preferred that the wall 18 be canted at a positive angle of about 10° from the horizontal. By positive angle it is meant that the lip of the wall 18 be somewhat higher than the bottom portion of the wall 18.

The invention also contemplates that the cart 10 may be used as a passenger conveyance when the body portion is positioned so that one of the transverse walls 18 or 20 assumes a substantially horizontal position while the other transverse wall 20 or 18 assumes a generally vertical position. To that end, the body portion 12 includes means for supporting a seat member 90 (FIG. 3) in a generally horizontal position adjacent the vertically disposed transverse wall. In the preferred embodiment of the cart 10, seat supporting shoulders 88 are formed on the inner surface of the longitudinal walls 22 and 24 so as to present supporting surfaces which are disposed substantially perpendicularly to the transverse walls adjacent the shoulders 88.

In FIGS. 3 and 4, a seat member 90 is positioned on the seat supporting shoulders 88 adjacent transverse wall 20 so that passengers may sit on the seat 90 with their backs supported by the wall 20 and with their feet resting on transverse wall 18. Similarly, the cart 10 may be used as a passenger conveyance when the body portion 12 is rotated approximately 90° in a clockwise direction from the position shown in FIGS. 3 and 4 by mounting the seat 90 on the seat supporting shoulders 88 adjacent the transverse wall 18 so that, when the body portion is rotated to the latter position, the passengers may sit with their backs against the first transverse wall 18 with their feet resting on the now approximately horizontally disposed second transverse wall 20.

In order to securely position the body portion 12 in its relative position to the frame 14 wherein the first transverse wall 18 is approximately horizontal, it is preferred to provide locking means 92 to lock the transverse wall 18 to the frame 14. The frame closing member 56 is preferably located remotely from the body pivot axis 38 at a distance selected so that the upper lip of the first transverse wall 18 when rotated toward the frame 14 is adjacent the closing member 56. As shown in FIG. 3, the locking means 92 comprises a locking strap 94 mounted to a bar 95 fastened to the lip of front wall 18, which strap extends outwardly from the wall 18 and has a locking aperture 96 formed therein. An L-shaped locking member 98 is secured to the frame closing member 56 so as to extend upwardly therefrom, and the strap aperture 96 receives the top of the L-shaped member 98 to prevent adverse pivoting of the body portion 12. The length of the locking strap 94 is preferably selected so as to lock the first transverse wall 18 at a positive position of about 10° with respect to the horizontal, for the reasons discussed above.

The cart 10 may be towed by any desired means, such as, for example, by hand or by a conventional garden tractor. In order to facilitate attachment to a towing means, the outer end of the towing member 56 shown in FIG. 1 includes two spaced plates 100 in which are formed aligned apertures 102 adapted to be connected to the desired towing means. A conventional garden tractor may be connected to the cart 10 by inserting the tractor's towing tongue between the plates 100 until the tongue apertures and plate apertures 102 are aligned, and then merely inserting a pin or similar device for connection. Should it be desired to tow the cart by hand, the invention provides a towing handle 104 adapted to be readily inserted into the towing apertures 102.

Further in accordance with the preferred embodiment of the invention, means are provided for rapidly and easily mounting a canopy to the body portion. As shown in FIGS. 1 and 6, the upper portions of the body walls, 18, 20, 22 and 24 include upwardly opening canopy post receiving sockets. Preferably four canopy post receiving sockets 106 are provided adjacent the four corners defined by the upper lips of the walls 18, 20, 22 and 24. Canopy support posts 108 can thus be mounted in the appropriate post sockets 106 so that the posts 108 are disposed parallel to the body vertical mid-plane 28. A canopy 110 to be mounted on the support posts 108 is preferably adaptable for mounting above the carrying disposition (FIG. 1) wherein the vertical mid-plane 28 is substantially vertical or in its surrey position (FIGS. 3 and 4). The canopy 110 has four canopy post receiving fixtures 112 registered with the body canopy post sockets 106 so that four support posts 108 will position the canopy directly above the carrying compartment when it is in its normal carrying position. The canopy 110 preferably has a second set of canopy post receiving fixtures 114 positioned centrally within the canopy and disposed at about 45° with respect to the plane of the canopy so that the canopy 110 may be mounted above the carrying compartment 16 when the body portion is pivoted to its forward surrey position as shown in FIGS. 3 and 4, or when the body portion is pivoted to a rear surrey position wherein the rear wall 20 is approximately horizontal.

The U-shaped configuration of the frame 14 enables a variety of auxiliary pieces of equipment to be mounted to the cart 10 to further diversify the uses to which it can be put. For example, as shown in FIG. 8, a spraying unit 116 is mounted on the frame 14. The sprayig unit includes a motor or engine, high pressure pump and spray gun and is fluidly connected with the carrying compartment 16 by hose 118 connected to the liquid discharge aperture 66. Thus, the cart 10 may be used as a compact, high-volume spraying device which operates completely independently of other equipment.

A further use of the cart 10 is shown diagrammatically in FIG. 7 wherein a roller 120 is mounted on the frame 14. The weight of the rolling device may be conveniently increased by filling the carrying compartment 16 with a dense substance such as water to render its operation more efficient.

Having thus described the preferred embodiment of the invention, the advantages achieved thereby will be briefly reviewed By providing a cart 10 with a symmetric receptacle portion 12 preferably pivotally mounted in a balanced relationship to the supporting frame 14, the invention minimizes the chances of inadvertent spillage of the cart's contents and obviates the need for complex stabilizing frame work.

The wedge-shaped body portion 12, together with the ability of the body portion 12 to pivot freely in relation to the frame, enables the cart 10 to be used as: a conventional load carrier which may be easily loaded or unloaded by simply pivoting the balanced body portion to the desired position; a flat-bed conveyance in either a forward or rear position, a passenger vehicle in either a forward or rear position by mounting a seat 90 on the shoulders 88; and a free-standing serving cart or the like by mounting shelves 87 on shoulders 86. Moreover, a plurality of associated equipment, as illustrated by the spraying equipment 116 and roller 120, may be mounted to the frame 14 to adapt the cart 10 for a variety of other purposes.

In view of this description a number of modifications and equivalents of this invention may become apparent to those skilled in the art. It is, therefore, my intention to cover all modifications and equivalents which do not depart from the spirit and scope of the invention as defined by the appended claims.

I claim:

1. A cart-like vehicle, having a primary utility either as a conveyance for personnel or in the transport and dumping of loads, comprising: a tiltable body including pairs of opposed walls defining a concave carrying compartment, one pair being end walls which are sloped inwardly and downwardly toward the compartment bottom and being disposed generally symmetrically with respect to a transverse mid-plane bisecting said compartment; elongated main framing having portions disposed below the level of said body, at least when the latter is in an upright position, and having wheels mounted for rotation about axle means carried by a portion of said framing which is disposed subjacent a generally central portion of the length of said body, said framing further having a projecting end portion extending longitudinally of said body, and adapted for moving said vehicle; and means mounting said body upon said framing with freedom for tilting movements, with respect to said framing, from a central load-carrying position, in which the compartment concavity faces upwardly and said mid-plane extends generally vertically above said wheels, to a first, longitudinally-tilted conveyance position in which one of said end walls is approximately horizontal and the concavity faces in the direction of extension of said end portion of said framing, and to a second, longitudinally-tilted load-dumping position in which said concavity faces generally oppositely as compared with the first direction of tilt and in which dumping position the other of said end walls of said body may extend downwardly to a position where its extreme edge is closely adjacent to a surface on which said wheels ride, said mounting means further comprising structure upstanding from said main framing, and including pivot means coupled to said body in an intermediate region of body height, and defining an axis of pivotation lying substantially in said mid-plane, said axis being generally parallel with and disposed substantially vertically above, said axle means.

2. A vehicle according to claim 1, and further including readily releasable stay means for securing said body in any of said three positions.

3. A cart according to claim 2 wherein said stay means comprises an elongated telescopically-adjustable rigid member, one end of which is pivotally connected to said framing and the other end of which is pivotally connected to said body.

4. A vehicle according to claim 1, and in which said body includes means for supporting a seat member within said concavity, said means being so configurated and disposed as to support such seat member in a generally horizontal position when said body is in said first tilted position.

5. A cart comprising an elongated, concave body portion forming a carrying compartment normally disposed in a first position with its concavity facing upwardly, a pair of wheels, and means associating said body portion and wheels, and including framing having means defining a first axis about which said wheels may rotate, and means defining a second axis parallel to and disposed generally vertically above said first axis, said latter means being coupled to said body portion in a region intermediate both its length and its height and providing for pivotation of said body portion, about said second axis, between a pair of opposed positions in each of which said concavity faces longitudinally, said body having two sloping end walls similar in length and in slope with relation to an upright plane containing said two axes when the concavity faces directly upwardly, and the angle between said two walls being such that in one of said opposed positions one such wall will be in a position close to the horizontal and in the other of said opposed positions, the extreme edge of the other such wall will be in close proximity to a surface on which said wheels ride.

6. A cart according to claim 5 wherein the sloping walls of said pair are substantially symmetrically disposed on opposite sides of the transverse vertical mid-plane of the body portion, the said pair of walls sloping upwardly and outwardly from the bottom of the carrying compartment so as to form substantially equal acute angles with said body portion mid-plane, whereby said body portion has a generally wedged-shaped configuration.

7. A cart according to claim 6 which further comprises means for locking said body portion to said framing when said body portion is pivoted so that a first said opposed angularly disposed body wall is approximately horizontal and the other said opposed, angularly disposed body wall is approximately vertically disposed above said first transverse wall.

8. A cart according to claim 5 which further comprises a roller rotatably mounted on said framing, spaced from said wheel axis.

9. A cart according to claim 5 wherein said body portion walls are fabricated of a plurality of plies of plastic material, one of which is ridged.

10. A cart according to claim 9 wherein there is a drain device accessible from the outside of the outer of the plies of plastic material, and adapted to drain liquid from the carrying compartment.

11. A cart according to claim 5 which further includes means adapted to mount a canopy in a generally horizontal position over said carrying compartment, in at least two of the operating positions of said compartment.

12. A cart comprising: a body portion including walls defining a carrying compartment which is substantially symmetrically disposed about a mid-plane bisecting said body portion, said body portion walls including a pair of walls disposed on opposite sides of said body portion mid-plane and sloping upwardly and outwardly from the bottom of said carrying compartment so as to form substantially equal acute angles with said body portion mid-plane; so as to have a generally wedge-shaped configuration; a frame; means for pivotally mounting said body portion to said frame about a horizontal pivoting axis; means for locking said body portion to said frame when said body portion is pivoted so that a first of said pair of opposed angularly disposed body walls is approximately horizontal and the other of said pair of opposed, angularly disposed body walls is approximately vertically disposed above said first angularly disposed wall; shoulders on the interiors of said body walls adjacent and perpendicular horizontal seat member within the carrying compartment; and wheel means mounted to said frame for rotation about a horizontal transverse axis located below said body portion pivoting axis.

* * * * *